(12) United States Patent
Masuda

(10) Patent No.: US 10,551,554 B2
(45) Date of Patent: Feb. 4, 2020

(54) DISPLAY DEVICE

(71) Applicant: SHARP KABUSHIKI KAISHA, Sakai, Osaka (JP)

(72) Inventor: Junichi Masuda, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 4 days.

(21) Appl. No.: 15/781,258

(22) PCT Filed: Dec. 2, 2016

(86) PCT No.: PCT/JP2016/085866
§ 371 (c)(1),
(2) Date: Jun. 4, 2018

(87) PCT Pub. No.: WO2017/099010
PCT Pub. Date: Jun. 15, 2017

(65) Prior Publication Data
US 2018/0356584 A1   Dec. 13, 2018

(30) Foreign Application Priority Data
Dec. 11, 2015 (JP) ................................. 2015-241997

(51) Int. Cl.
*F21V 8/00* (2006.01)
*G09G 3/36* (2006.01)
*G02F 1/1335* (2006.01)

(52) U.S. Cl.
CPC ........... *G02B 6/0056* (2013.01); *G02B 6/004* (2013.01); *G02B 6/0055* (2013.01); *G09G 3/3611* (2013.01); *G02B 6/0036* (2013.01); *G02B 6/0041* (2013.01); *G02F 1/133536* (2013.01); *G02F 1/133615* (2013.01); *G02F 2001/133548* (2013.01); *G02F 2203/01* (2013.01); *G09G 3/3648* (2013.01); *G09G 2300/023* (2013.01); *G09G 2300/04* (2013.01)

(58) Field of Classification Search
CPC ........ G02B 6/0055; G02B 6/00; G02B 6/004; G02B 6/0056; G09G 3/3648; G09G 3/3611; G09G 2300/023; G09G 2300/04; G02F 2203/01; G02F 1/133615; G02F 2001/133548; G02F 1/133536
See application file for complete search history.

(56) References Cited

U.S. PATENT DOCUMENTS

| | | | |
|---|---|---|---|
| 2007/0047214 A1 | 3/2007 | Nesterenko et al. | |
| 2013/0271674 A1* | 10/2013 | Liu | ................. G02F 1/133621 349/12 |
| 2016/0154269 A1 | 6/2016 | Fukuoka et al. | |
| 2016/0187724 A1 | 6/2016 | Masuda et al. | |

FOREIGN PATENT DOCUMENTS

| WO | 2015/020032 A1 | 2/2015 |
|---|---|---|
| WO | 2015/053023 A1 | 4/2015 |

* cited by examiner

*Primary Examiner* — Muhammad N Edun
(74) *Attorney, Agent, or Firm* — ScienBiziP, P.C.

(57) ABSTRACT

Provided is a display device with a see-through display which can be produced at low cost by using a reduced number of components. A display 110 capable of see-through display uses a light guide 20 integrally formed with a wire grid 70, which has the function of a conventional component as typified by a reflective polarizing plate. Accordingly, the display 110 has a reduced number of components, resulting in shorter assembly time. Thus, the cost of producing a liquid crystal display device 100 can be reduced.

8 Claims, 14 Drawing Sheets

FIG. 2
FRONT SIDE
60
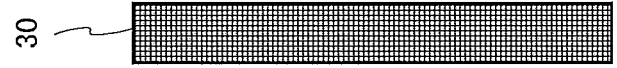
30
50
40
110
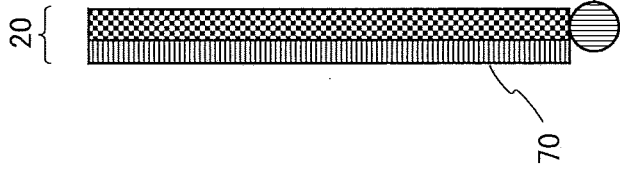
20
70
10
BACK SIDE

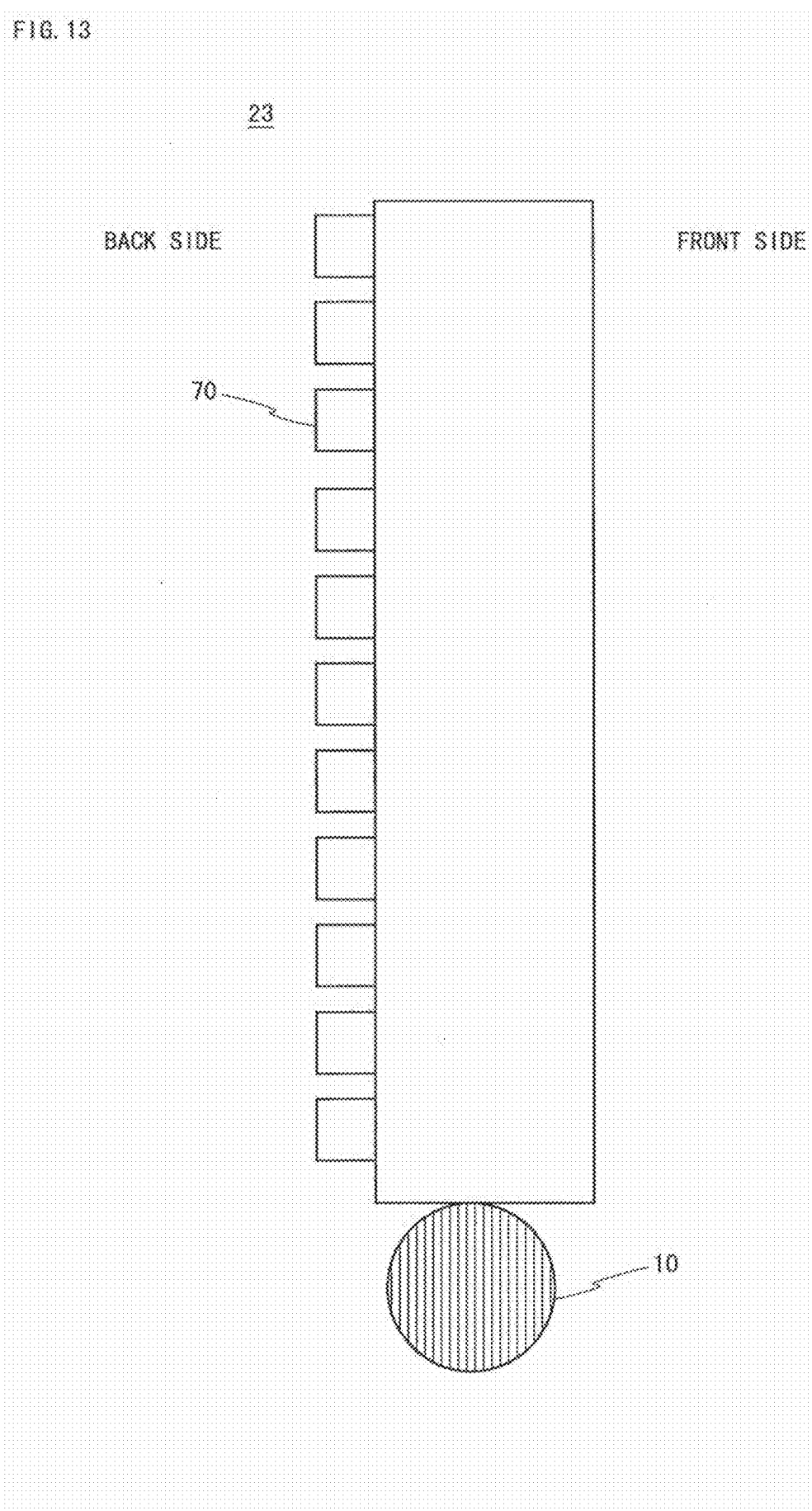

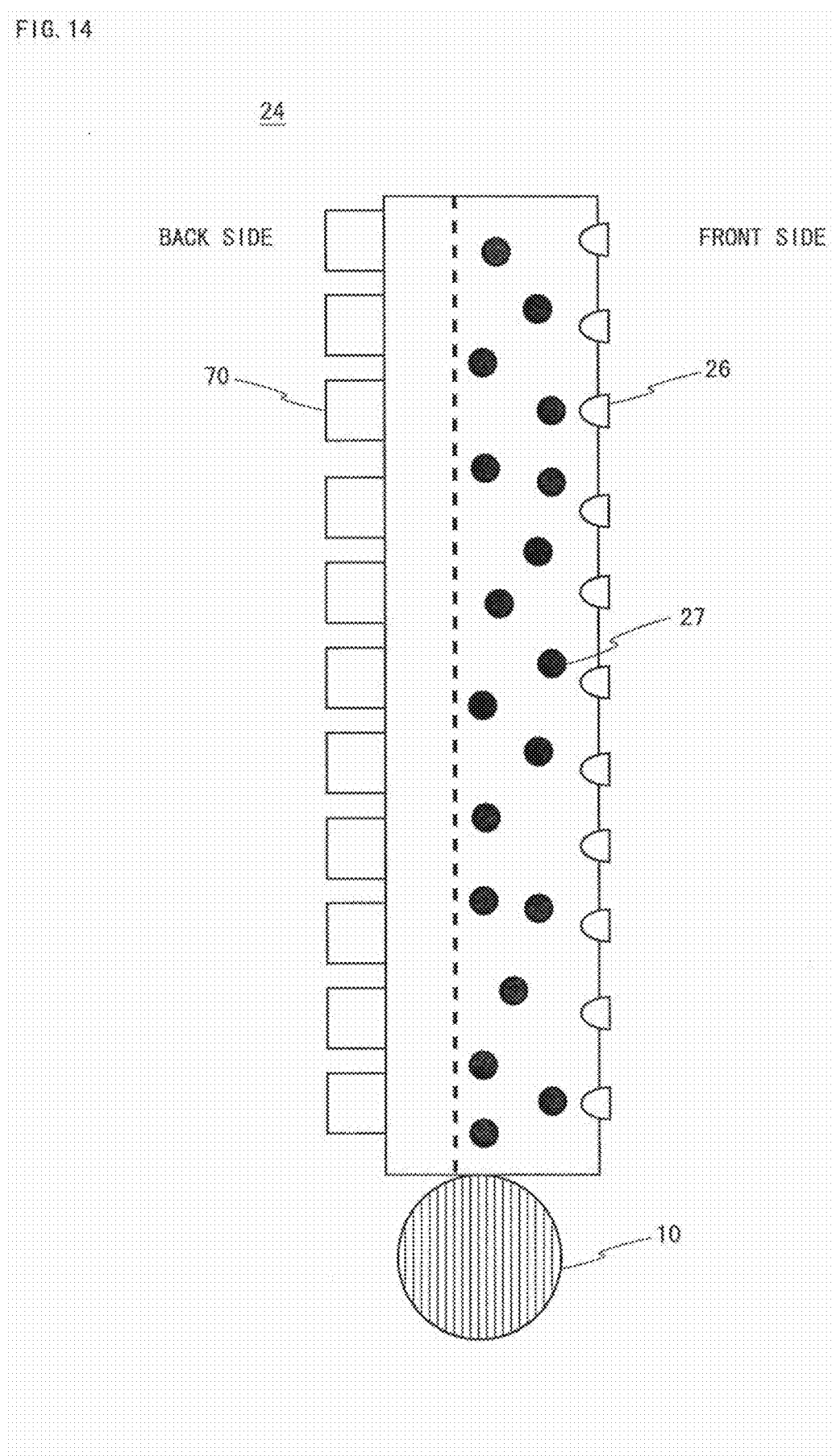

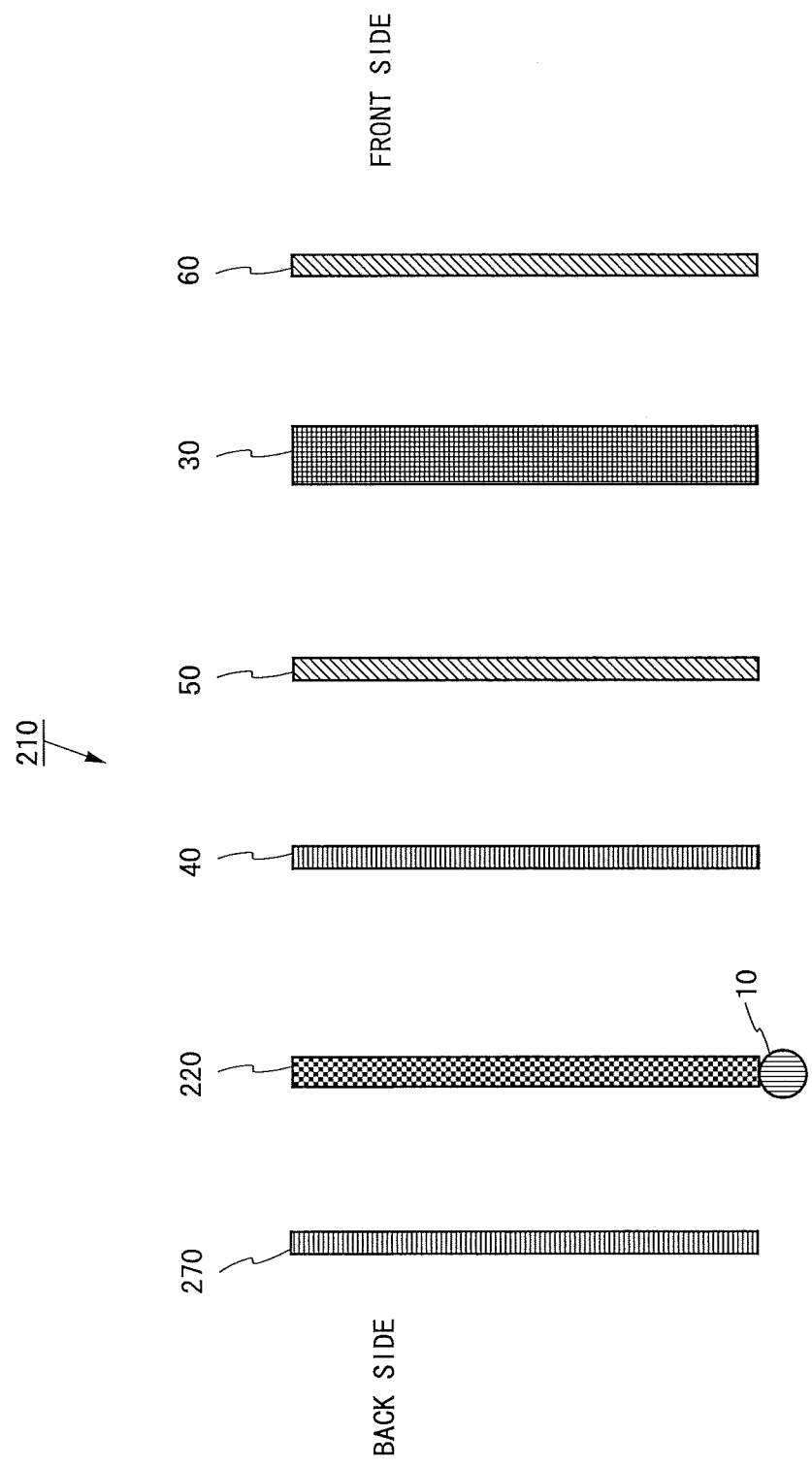

DISPLAY DEVICE

TECHNICAL FIELD

The present invention relates to display devices, particularly to a display device with a see-through display through which a background is seen.

BACKGROUND ART

Recent years have seen active development of displays, called see-through displays (or transparent displays), which can not only display images but also allow objects behind the displays to be viewed through screens. To realize such a see-through display, there have been proposed various approaches which use a liquid crystal panel or an organic EL (electroluminescent) panel. For example, Patent Document 1 describes a display 210 functioning as a see-through display, which is configured such that first and second reflective polarizing plates 40 and 270 are disposed on front and back sides, respectively, relative to a light guide 220, which is positioned therebetween, as shown in FIG. 15. Both the first and second reflective polarizing plates 40 and 270 are polarizing plates which reflect a polarization component of a specific polarization and transmit therethrough a polarization component of a polarization perpendicular to specific polarization. Moreover, the light guide 220 has light source 10 attached at an edge. Further, first and second absorptive polarizing plates 60 and 50 are disposed on the front and back sides, respectively, relative to a liquid crystal panel 30. Both the first and second absorptive polarizing plates 60 and 50 are polarizing plates which absorb a specific polarization component and transmit therethrough a polarization component perpendicular to the specific polarization component.

The display 210 as above controls a signal voltage to be applied to the liquid crystal panel 30 and also provides control over turning on or off the light source 10, whereby an image based on an externally provided image signal can be displayed and background light incident from the back side can be transmitted to the front side, as described in Patent Document 1. Thus, the viewer on the front side of the display 210 can see not only an image displayed on the liquid crystal panel 30 illuminated by backlight but also a background by virtue of background light transmitted to the front side when the light source 10 is off.

CITATION LIST

Patent Document

Patent Document 1: International Publication WO 2015/053023

SUMMARY OF THE INVENTION

Problems to be Solved by the Invention

However, in the display 210 described in Patent Document 1, the light guide 220, which illuminates the liquid crystal panel 30 with backlight, and the second reflective polarizing plate 270, which has the functions of transmitting the polarization component of the specific polarization therethrough and reflecting the polarization component perpendicular to that polarization component, are disposed separately on the back side with respect to the liquid crystal panel 30. Accordingly, the display 210 is composed of more elements and therefore takes a long time to assemble. Thus, the cost of producing the display 210 is high.

Therefore, an objective of the present invention is to provide a display device including a see-through display that can be produced at low cost by using a reduced number of components.

Solution to the Problems

A first aspect of the present invention is directed to a liquid crystal display device with a display capable of display in a transparent display mode whereby a background is seen through the display, the device comprising:
 a light source configured to emit source light;
 a light guide configured to emit the source light derived from the light source and incident thereon toward a front or back side of the display; and
 an image display portion configured to be capable of transmitting the source light emitted by the light guide therethrough, thereby displaying an image based on an image signal externally provided for image display, and also capable of transmitting background light incident from the back side therethrough toward the front side, thereby allowing the background to be seen, wherein,
 the light guide has a wire grid integrally provided on a back surface, the wire grid functioning as a reflective polarizer.

In a second aspect of the present invention, based on the first aspect of the present invention, wherein,
 the light guide is formed with a resin and has a first area and a second area provided between a front surface and the first area, the first area having such a depth as to allow the wire grid to be embedded in the back surface of the light guide,
 the wire grid is embedded in the first area, and
 the second area has a diffusing agent added so as to diffusely reflect incident light and thereby generate light of a plurality of different polarizations.

In a third aspect of the present invention, based on the second aspect of the present invention, wherein the light guide has a plurality of light extraction geometrical members provided on the front surface.

In a fourth aspect of the present invention, based on the first aspect of the present invention, wherein the wire grid is provided on the back surface of the guide.

In a fifth aspect the present invention, based on the fourth aspect of the present invention, wherein the light guide has a plurality of light extraction geometrical members provided on a front surface.

In a sixth aspect of the present invention, based on the fifth aspect of the present invention, wherein the light extraction geometrical member is convex or concave.

In a seventh aspect of the present invention, based on the fourth aspect of the present invention, wherein,
 the light guide is formed with a resin, and
 the light guide has a diffusing agent added across the entirety so as to diffusely reflect incident light and thereby generate light of different polarizations.

In an eighth aspect of the present invention, based on the fourth aspect of the present invention, wherein the light guide is formed with glass.

In a ninth aspect of the present invention, based on the seventh or aspect of the present invention, wherein the light guide has a plurality of light extraction geometrical members provided on a front surface.

Effect of the Invention

In the first aspect, the wire grid, which has the function of a conventional component as typified by a reflective polarizing plate, is integrated with the light guide, resulting in a reduced number of components of the display and hence shorter assembly time. Thus, the cost of producing the display device can be reduced.

In the second aspect, the wire grid is embedded in the first area of the light guide and therefore is less likely to be damaged and suffer an impaired polarizer function. In addition, the diffusing agent is mixed in the second area ranging from the front surface of the light guide to a point slightly short of the wire grid. Accordingly, the first or second polarization component incident on the light guide is diffusely reflected by the diffusing agent, whereby light of first and second polarization components is generated. Thus, more light is emitted from the light guide, resulting in enhanced image display quality.

The third aspect renders it possible to facilitate light extraction from the light guide.

The fourth aspect renders it possible to achieve the same effect as the first aspect.

The fifth aspect renders it possible for the fourth aspect to achieve the same effect as the third aspect.

The sixth aspect renders it possible to achieve the same effect as the fifth aspect.

In the seventh aspect, the first or second polarization component incident on the light guide is diffusely reflected by the diffusing agent, whereby light of first and second polarization components is generated. Thus, more light is emitted from the light guide, resulting in enhanced image display quality. Moreover, the present aspect inhibits a moiré pattern, which might occur due to the light extraction geometrical members being arranged at predetermined intervals, and therefore, display quality of an image displayed on the display can be enhanced.

The eighth aspect renders the surface of the light guide more resistant to damage because glass is harder than resin. Thus, display quality of an image displayed on the display can be kept high.

The ninth aspect renders it possible for either the seventh or eighth aspect to achieve the same effect as the third aspect.

BRIEF DESCRIPTION OF THE DRAWINGS

FIG. 2 is a diagram illustrating the configuration of a display included in the liquid crystal display device according to the embodiment of the present invention.

FIG. 13 is a diagram illustrating the configuration of a third variant of the light guide used in the display of the liquid crystal display device shown in FIG. 2.

FIG. 14 a diagram illustrating the configuration of a fourth variant of the light guide used in the display of the liquid crystal display device shown in FIG. 2.

FIG. 15 is a diagram illustrating the configuration of a light guide used in a display of a conventional liquid crystal display device.

MODE FOR CARRYING OUT THE INVENTION

<1. Embodiment>
<1.1 Configuration of the Liquid Crystal Display Device>

Figure 1:
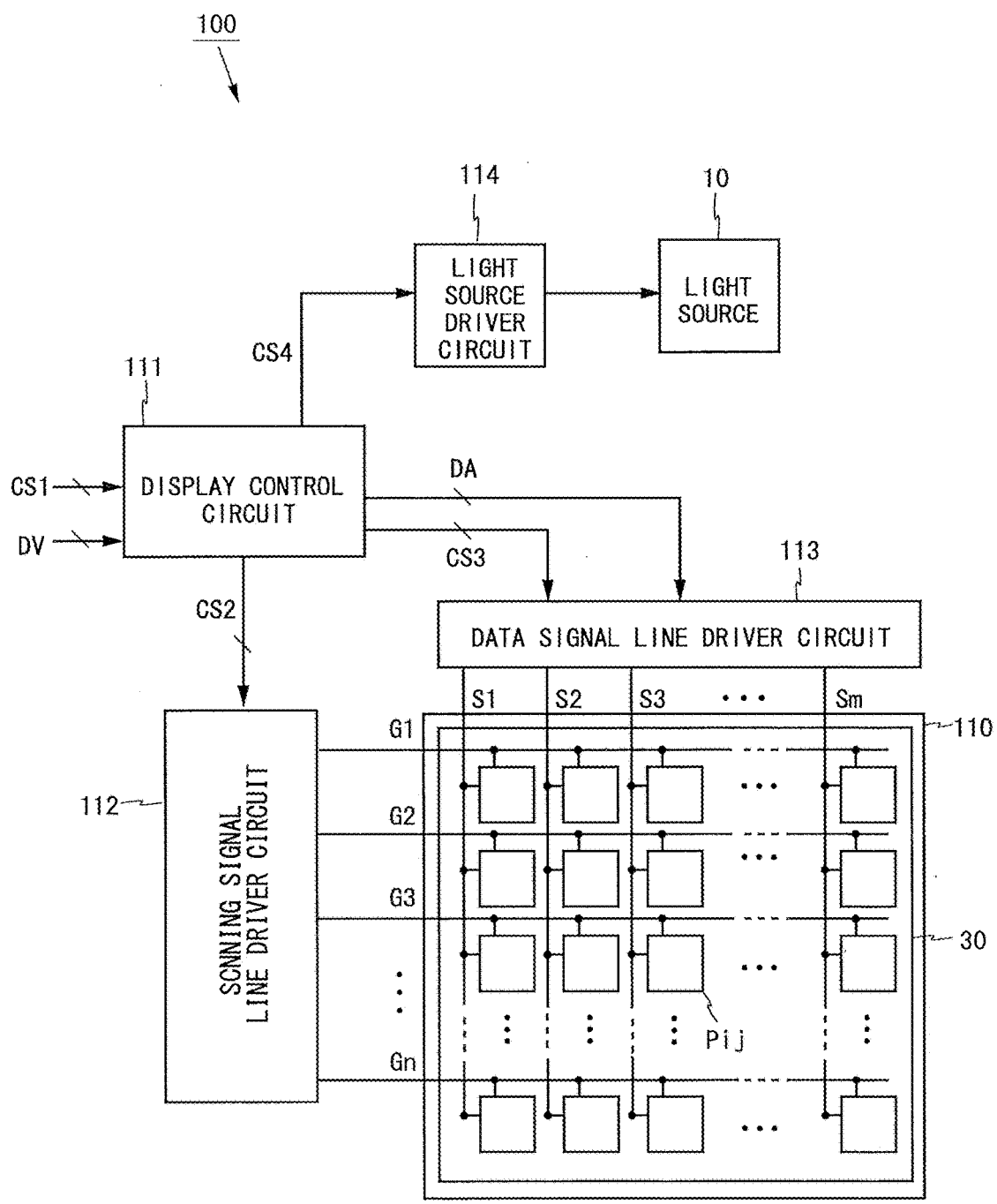
FIG. 1 is a block diagram illustrating the configuration of a liquid crystal display device according to an embodiment of the present invention.

FIG. 1 is a block diagram illustrating the configuration of a liquid crystal display device 100 according to an embodiment of the present invention. The liquid crystal display device 100 is an active-matrix display device including a display 110 capable of display in a transparent display mode, a display control circuit 111, a scanning signal line driver circuit 112, a data signal line driver circuit 113, and a light source driver circuit 114, as shown in FIG. 1. Note that the display 110 includes a liquid crystal panel 30 and other elements such as a light guide with a light source 10 attached thereto and various polarizing plates, and the configuration of the display 110, including these elements, will be described later.

The liquid crystal panel 30 included in the display 110 has formed thereon n scanning signal lines $G_1$ to $G_n$, m data signal lines $S_1$ to $S_m$, and (m×n) pixels $P_{ij}$. Here, n and m are integers of 2 or more, i is an integer of from 1 to m, and j is an integer of from 1 to n. The scanning signal lines $G_1$ to $G_n$, are disposed in parallel to one another, and the data signal lines $S_1$ to $S_m$ are disposed in parallel to one another so as to cross the scanning signal lines $G_1$ to $G_n$. The pixels $P_{ij}$ are disposed at respective intersections of the scanning signal lines $G_i$ and the data signal lines $S_j$. As a result, the (m×n) pixels $P_{ij}$ are arranged in a matrix with each row consisting of m pixels and each column consisting of n pixels. The scanning signal line $G_i$ is connected in common to m pixels $P_{ij}$ disposed in the i'th row, and the data signal line is connected in common to a pixels $P_{ij}$ disposed in the row. Note that in the case where the display 110 is used to display a color image, the liquid crystal panel 30 includes co or filters (not shown) formed thereon.

A control signal CS1, including a horizontal synchronization signal and a vertical synchronization signal, and an image signal DV are externally inputted to the display control circuit 111 of the liquid crystal display device 100. In accordance with the control signal CS1, the display control circuit 111 outputs control signal CS2, including a gate start pulse signal and a gate clock signal, to the scanning signal line driver circuit 112 and a control signal CS3, including a source start pulse signal, a source clock signal, and a latch strobe signal, and image data DA to the data signal line driver circuit 113.

Furthermore, on the basis of the image signal DV and the control signal CS1, the display control circuit 111 generates a control signal CS4 for controlling the light source driver circuit 114, and outputs the generated signal to the light source driver circuit 114. In accordance with the control signal CS4, the light source driver circuit 114 drives the light source 10, which is attached to an edge of the liquid crystal panel 30 for backlighting. The light source 10 for backlighting emits backlight toward the liquid crystal panel 30 from the back side.

<1.2 Configuration of the See-Through Display>

FIG. 2 is a diagram illustrating the configuration of the display 110 included in the liquid crystal display device 100 according to embodiment of the present invention. Disposed in the display 110, which functions as a see-through display, are, in order from front side to back side, a first absorptive polarizing plate 60, the liquid crystal panel 30, a second absorptive polarizing plate 50, a reflective polarizing plate 40, and a light guide 20, as shown in FIG. 2. The light guide 20, unlike the light guide 220 shown in FIG. 15, is a light guide with a wire grid 70, which is integrally formed on the back side and functions as a reflective polarizer. Note that the liquid crystal panel 30 and the first and second absorptive polarizing plates, which are disposed with the liquid crystal panel 30 positioned therebetween, will also be referred to collectively as the "image display portion".

It should be noted that the liquid crystal panel 30 will be described herein as being of a normally white type but may be of a normally black type. Moreover, light emitted by the light source 10 will be described herein as being linearly polarized light. The linearly polarized light includes two polarization components whose electric field vectors are perpendicular to each other. Accordingly, in the following descriptions, a polarization component whose electric field vector oscillates in a specific direction will be referred to as a "first component", and a polarization component whose electric field vector oscillates in a direction perpendicular to the specific direction will be referred to as a "second polarization component". Note that the source light does not have to be linearly polarized light and may be, for example, circularly or elliptically polarized light.

In the normally white liquid crystal panel 30, each pixel $P_{ij}$ is transparent in off state (where no signal voltage is being written or a 0V signal voltage is being written), and therefore, as the applied signal voltage becomes higher, light transmission becomes lower. The liquid crystal panel 30 has the first absorptive polarizing plate 60 affixed to the front surface and the second absorptive polarizing plate affixed to the back surface. Accordingly, the first absorptive polarizing plate 60 is assumed to be a polarizing plate which transmits the second polarization component therethrough and absorbs the first polarization component, and the second absorptive polarizing plate 50 to be described later is assumed to be a polarizing plate which, in contrast, absorbs the second polarization component and transmits the first polarization component therethrough.

The light guide 20 is formed with a transparent resin, e.g., polymethyl methacrylate (PMMA) or polycarbonate (PC), and has the light source 10 attached at an edge, and the light source 10 includes, for example, red, green, and blue LEDs (light-emitting devices) arranged in a line. Accordingly, when the light source 10 emits light, including the first and second polarization components, and the light is incident on the light guide 20, the light travels while experiencing total reflections on surfaces of the light guide 20, and exits the light guide 20 from the front surface toward the front side of the display 110 and also from the back surface toward the back side of the display 110. Note that the LEDs are disposed at the edge or the light guide 20, and therefore, background light incident from the back side of the display 110 can be transmitted through the light guide 20 without being blocked by the LEDs.

Figure 3:
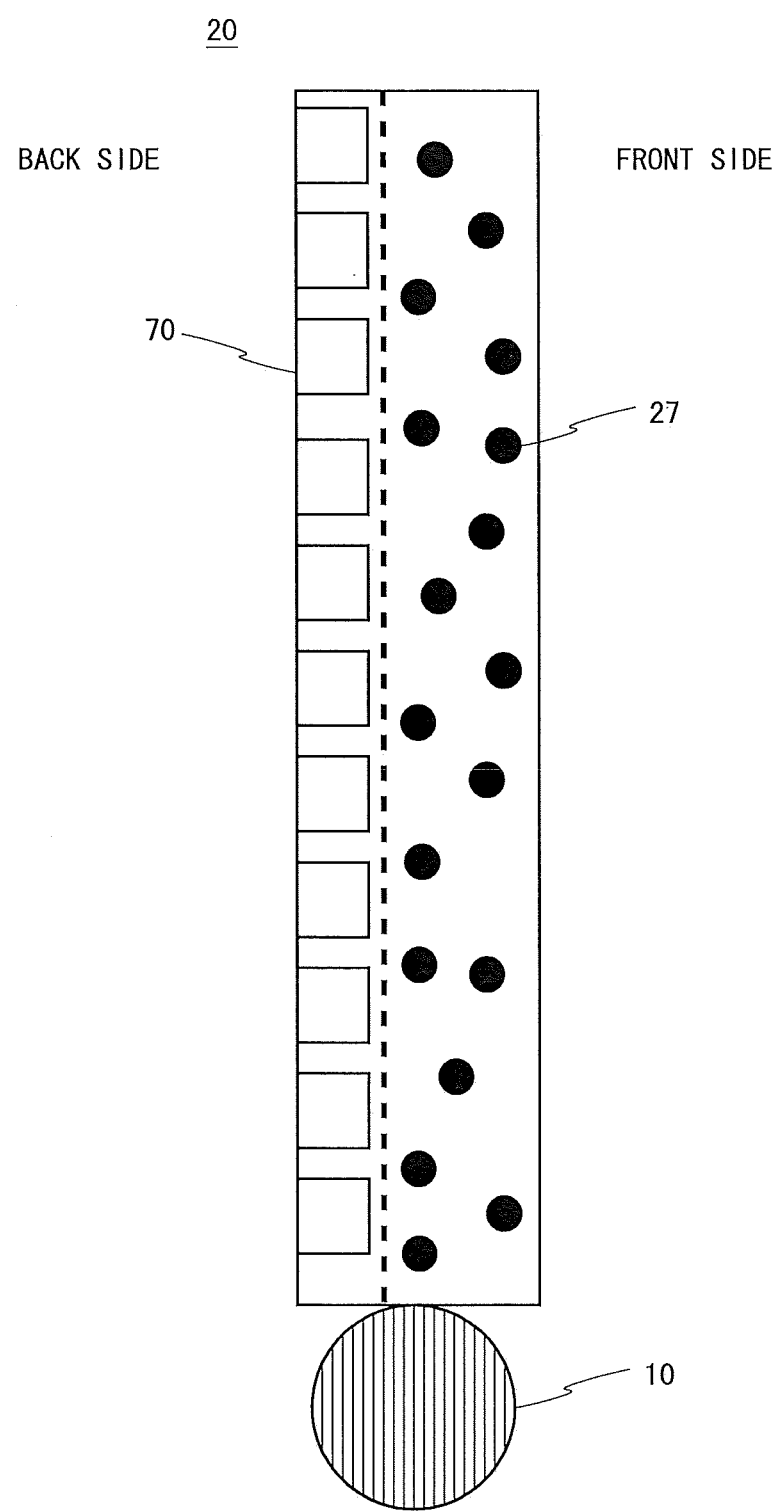
FIG. 3 is a cross-sectional view of a light guide included in the display shown in FIG. 2.

FIG. 3 is a cross-sectional view of the light guide 20 included in the display 110 shown in FIG. 2. The wire grid 70 is embedded in the light guide 20 in an area (first area) close to the back surface of the light guide 20, such that the surface of the wire grid 70 is approximately flush with the surface of the light guide 20, as shown in FIG. 3. The wire grid 70 includes a plurality of metallic wires arranged in parallel, and functions as a reflective polarizer which transmits therethrough light of a polarization component whose electric field vector is vertical to the wires and reflects light of a polarization component whose electric field vector is parallel to the wires. Accordingly, the wire grid 70 will be described herein as a reflective polarizer which transmits the first polarization component therethrough and reflects the second polarization component. Note that the wire grid 70 may be buried in the light guide 20.

The guide 20 has a diffusing agent 27 added in an area (second area) ranging from the front surface of the light guide 20 to a point slightly short of the wire grid 70, the area being sandwiched between the front surface and a dotted line shown in FIG. 3. In contrast, no diffusing agent 27 is added in the area sandwiched between the dotted line and the back surface where the wire grid 70 is embedded. The diffusing agent is transparent particulate silica or suchlike, and has a particle diameter of, preferably, from some tens of micrometers to some hundreds of micrometers, more preferably, from approximately 20 μm to approximately 300 μm. Moreover, the diffusing agent 27 preferably has a spherical particle shape, but may have a conical or pyramidal particle shape.

Figure 4:
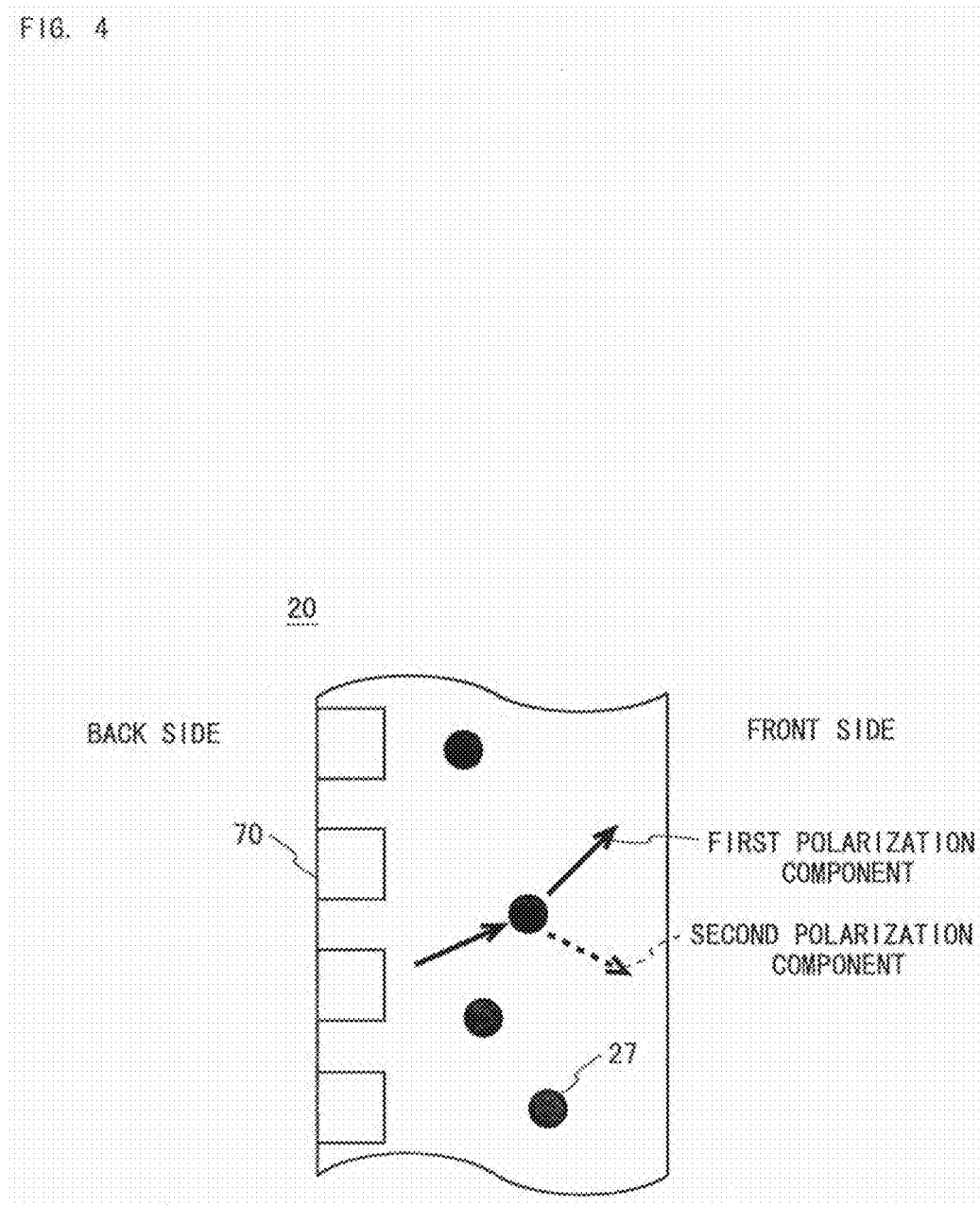
FIG. 4 is a diagram illustrating diffuse reflection where light is incident on a diffusing agent in the light guide included in the display shown in FIG. 2.

FIG. 4 is a diagram illustrating diffuse reflection where light is incident on the diffusing agent 27 in the light guide 20 shown in FIG. 3. When light of the first or second polarization component is incident on the diffusing agent 27, the diffusing agent 27 diffusely reflects the light, thereby generating light of the first and second polarization components, as shown in FIG. 4. As a result, the amount of light in the light guide 20 increases when compared to the amount of light before the diffuse reflection. Accordingly, more light is diffusely reflected by the diffusing agent 27 in portions with the diffusing agent 27 added with a higher density, with the result that the first and second polarization components are generated in higher amounts in such portions. Therefore, the diffusing agent 27 may be added so as to be dense at and around the center of the light guide 20 and become less dense toward peripheral portions, or the diffusing agent 27 may be added so as to be constant in density within a predetermined range from the center of the light guide 20 and become less dense outside the predetermined range. As a result, the amount of light to be transmitted through the center of the liquid crystal panel 30 and a portion surrounding the center, whereby display image quality can be enhanced.

Furthermore, the diffusing agent 27 is not added to the resin in the area where the wire grid 70 is embedded. The reason for this is to prevent the following: if the diffusing agent 27 is added to the resin in the area where the wire grid 70 is embedded, when only the first polarization component of the source light is desired to be transmitted to the back side, the first polarization component is selected from the source light by the wire grid 70 and diffusely reflected by the diffusing agent 27, with the result that the second polarization component is generated and emitted toward the back side of the display 110, along with the first polarization component.

Furthermore, because the wire grid 70 is embedded in the light guide 20, damage to the wire grid 70 can be inhibited. Thus, the wire grid 70 can be used for a long period of time without losing the reflective polarizer function.

<1.3 Light Transmission and Absorption in the See-Through Display>

<1.3.1 Light Transmission and Absorption where an Image Signal is Being Provided to the Liquid Crystal Panel>

Figure 5:
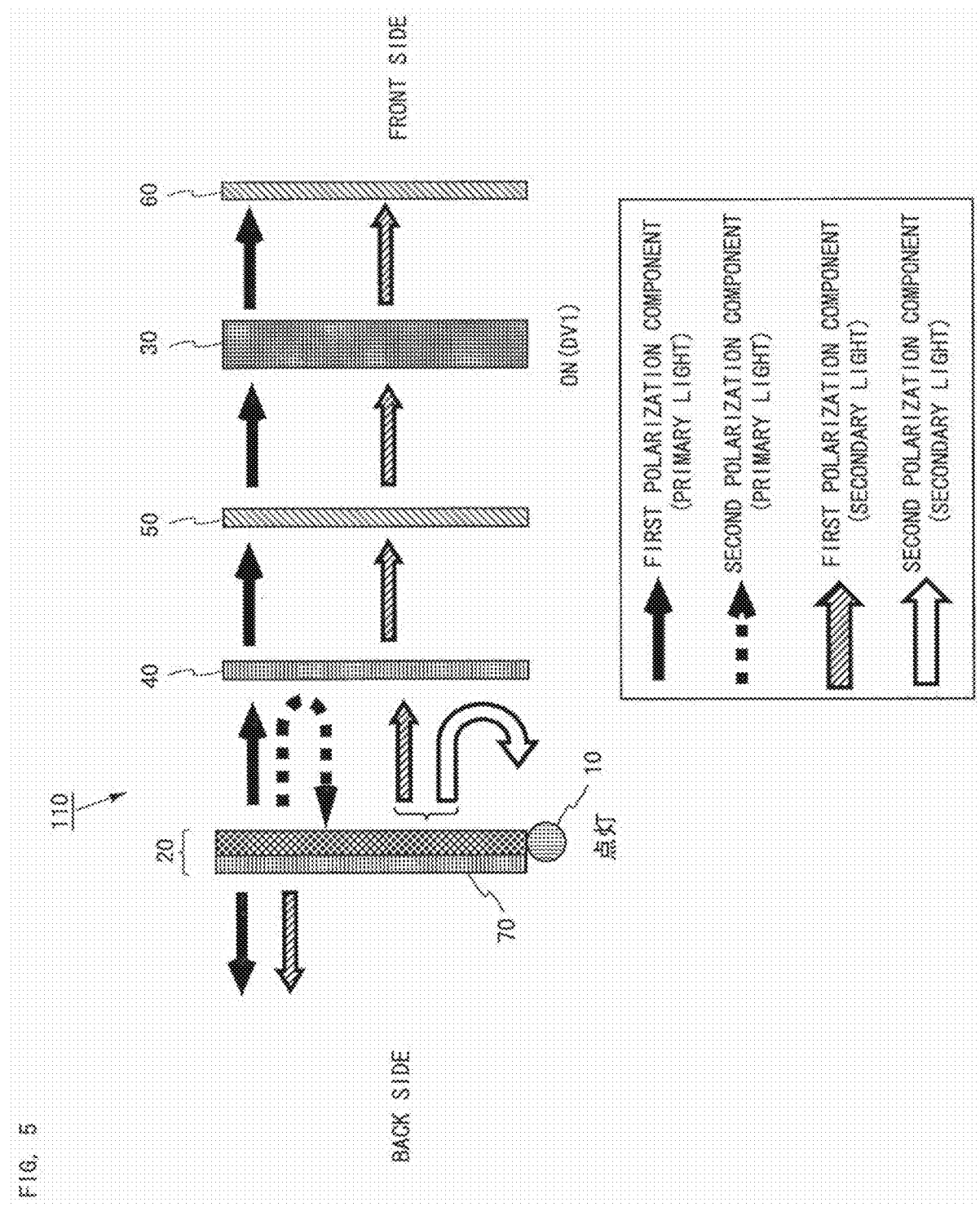
FIG. 5 is a diagram illustrating light transmission and absorption in the display of the embodiment where pixels of a liquid crystal panel are in ON state.
Figure 6:
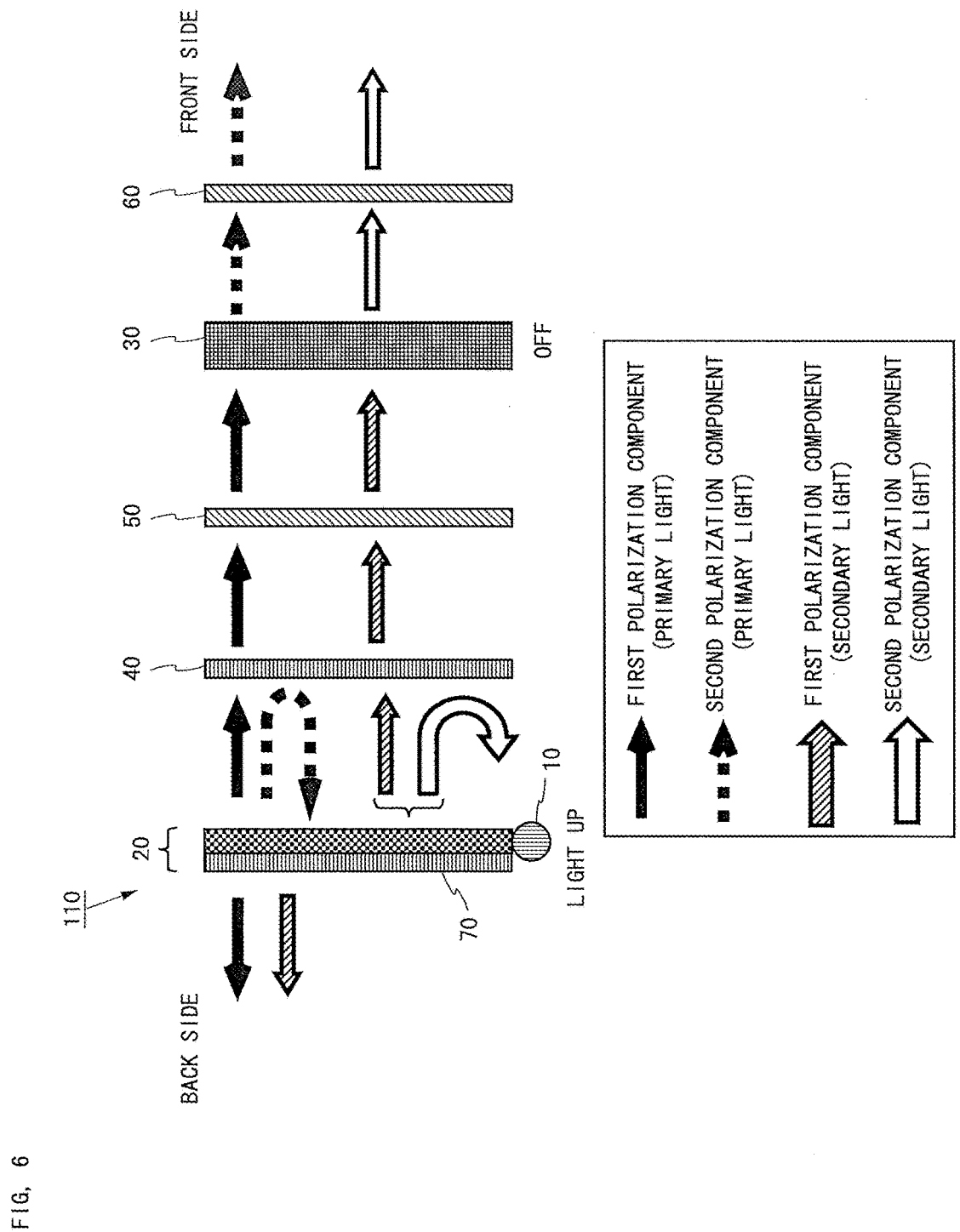
FIG. 6 a diagram illustrating light transmission and absorption in the display of the embodiment where the pixels of the liquid crystal panel are in OFF state.

FIG. 5 a diagram illustrating light transmission and absorption in the display 110 of the present embodiment where the pixels $P_{ij}$ of the liquid crystal panel 30 are in ON state, and FIG. 6 is diagram illustrating light transmission and absorption in the display 110 of the present embodiment where the pixels $P_{ij}$ of the liquid crystal panel 30 are in OFF state.

First, referring to FIG. 5, transmission and absorption of the first and second polarization components where the pixels $P_{ij}$ of the liquid crystal panel 30 are in ON state will be described. The first and second polarization components included in light emitted into the light guide 20 by the light source 10 are incident on both the wire grid 70 embedded in the light guide 20 and the reflective polarizing plate 40 disposed on the front side. The first and second polarization components incident on the wire grid 70 will be described first. Note that in the following descriptions, the first light emitted by the light guide 20 will be referred to as the "primary light", and the light reflected by the wire grid 70 or reflective polarizing plate 40 back to the light guide 20 and then emitted again from the light guide 20 will be referred to as the "secondary light".

The first polarization component of the primary light incident on the wire grid 70 is transmitted through the wire grid 70 toward the back side. On the other hand, the second polarization component is reflected and returned to the light guide 20 by the wire grid 70. From the returned second polarization component, the light guide 20 generates and emits first and second polarization components of secondary light toward the reflective polarizing plate 40.

The first polarization component of the secondary light incident on the reflective polarizing plate 40 is transmitted through the reflective polarizing plate 40 toward the second absorptive polarizing plate 50. On the other hand, the second polarization component of the secondary light is reflected and returned to the light guide 20 by the reflective polarizing plate 40. From the returned second polarization component of the secondary light, the light guide 20 generates and emits first and second polarization components of secondary light toward the wire grid 70. Thereafter, similarly, of the first and second polarization components incident on the wire grid 70 or the reflective polarizing plate 40, only the first polarization component is transmitted through the wire grid 70 or the reflective polarizing plate 40, and the second polarization component is repeatedly reflected between the wire grid 70 and the reflective polarizing plate 40.

Furthermore, as for the first and second polarization components of the primary light derived from the light guide 20 and being incident on the reflective polarizing plate 40, the first polarization component is transmitted through the reflective polarizing plate 40 toward the second absorptive polarizing plate 50, as in the above case. The second polarization component is reflected and returned to the light guide 20 by the reflective polarizing plate 40. From the returned second polarization component of the primary light, the light guide 20 generates and emits first and second polarization components of secondary light to the wire grid 70. Thereafter, similarly, the first polarization component is transmitted through the wire grid 70 or the reflective polarizing plate 40, and the second polarization component repeatedly reflected between the wire grid 70 and the reflective polarizing plate 40.

In this manner, the first polarization component in each of the primary light and the secondary light incident on the reflective polarizing plate 40 is transmitted through the reflective polarizing plate 40 toward the second absorptive polarizing plate 50. The second polarization component is repeatedly reflected between the wire grid 70 and the reflective polarizing plate 40 before returning to the light guide 20 and being used by the light guide 20 to generate first and second polarization components of secondary light.

The first, polarization component in each of the primary light and the secondary light incident on the second absorptive polarizing plate 50 is transmitted through the second absorptive polarizing plate 50 and incident upon on-state pixels $P_{ij}$ of the liquid crystal panel 30. The on-state pixels $P_{ij}$ emit the first polarization component toward the first absorptive polarizing plate 60 without changing the polarization state thereof. However, since the first absorptive polarizing plate 60 is designed to absorb the first polarization component, the first polarization component incident on the first absorptive polarizing plate 60 is absorbed and is not transmitted toward the front side. As a result, screen portions that correspond to the on-state pixels $P_{ij}$ are displayed in black due to light being shielded.

Next, referring to FIG. 6, transmission and absorption of the first and second polarization components by off-state pixels $P_{ij}$ will be described. In this case, as in the case in FIG. 5, of the light emitted by the light guide 20, only the first polarization component in each of the primary light and the secondary light is incident on off-state pixels $P_{ij}$ of the liquid crystal panel 30. The off-state pixels $P_{ij}$ convert the first polarization component incident thereon to the second polarization component, and emit the second polarization component toward the first absorptive polarizing plate 60. Since the first absorptive polarizing plate 60 is designed to transmit the second polarization component of incident light therethrough, the second polarization component is transmitted toward the front side. As a result, screen portions that correspond to the off-state pixels $P_{ij}$ are displayed in white due to backlight being transmitted.

As above, the pixels $P_{ij}$ of the liquid crystal panel 30 are rendered in ON state when a signal voltage generated based on image data DA is written thereto, with the result that screen portions that correspond to these pixels are displayed in black. On the other hand, the pixels are in OFF state when the signal voltage is not being written thereto, with the result that screen portions that correspond to these pixels are displayed in white. Accordingly, the liquid crystal panel 30 displays a monochrome (i.e., black-and-white) image consisting of the screen portions displayed in black and the screen portions displayed in white. Thus, the viewer on the front side can see a monochrome image based on an image signal DV. Further, in the case where the liquid crystal panel 30 has color filters formed thereon, a color image is displayed.

It should be noted that the light that reaches the front side of the display 110 includes not only the second polarization component converted from the first polarization component of the primary light but also the second polarization component converted from the first polarization component of the secondary light. Accordingly, more light reaches the front side, whereby a monochrome image can be displayed with enhanced contrast.

In this case, the first polarization component of each of the primary light and the secondary light is transmitted through the wire grid 70 to the back side. As a result, the back of the display 110 appears to the viewer on the back side of the display 110 as if the back were emitting light.

<1.3.2 Light Transmission and Absorption where No Image Signal is Being Provided to the Liquid Crystal Panel>

Figure 7:
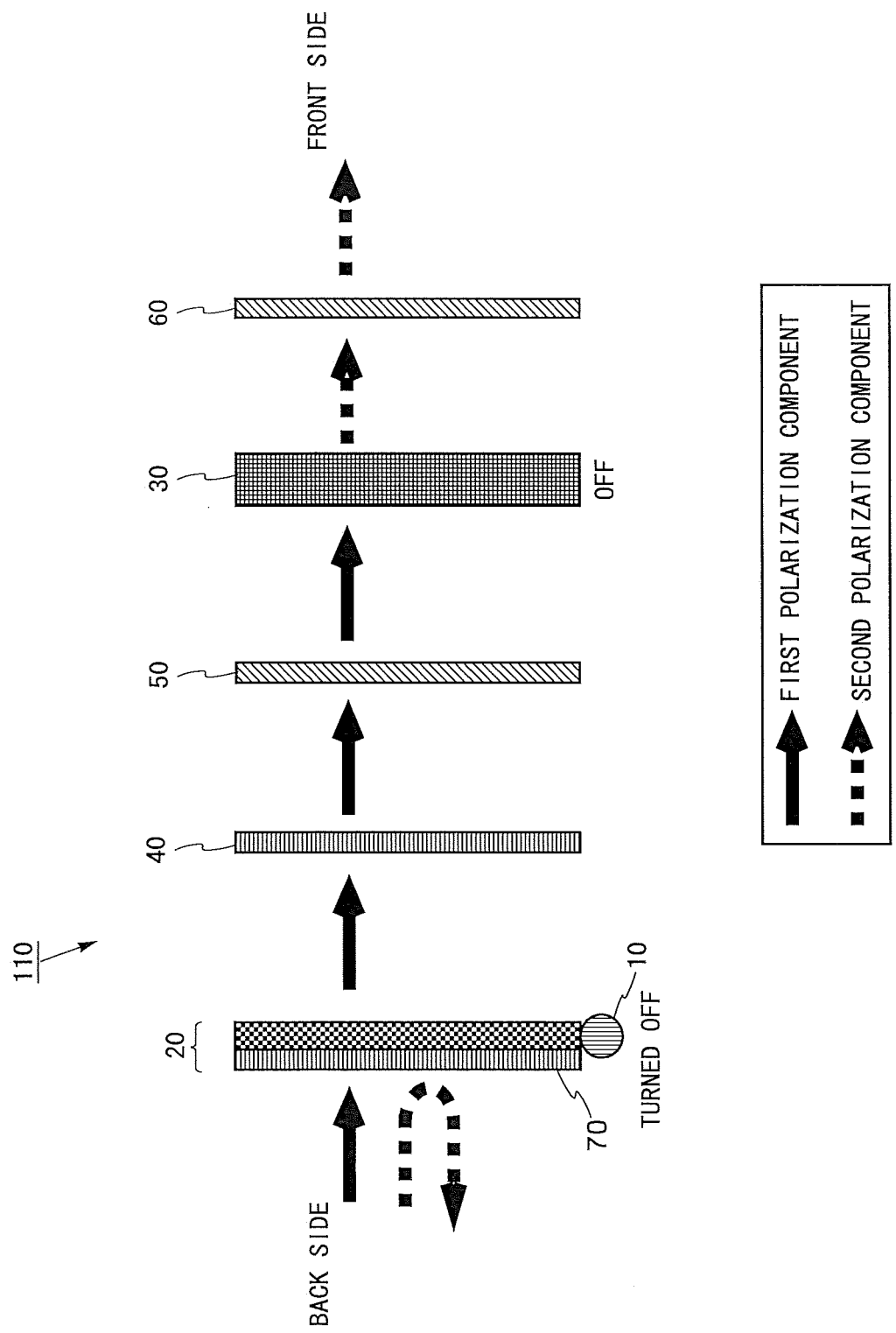
FIG. 7 is a diagram illustrating light transmission and absorption in the display used in the embodiment where a light source is turned off, thereby rendering all pixels of the liquid crystal panel in OFF state.

FIG. 7 is a diagram illustrating light transmission and absorption in the display 110 used in the present embodiment where the light source 10 is turned off, thereby rendering all pixels $P_{ij}$ of the liquid crystal panel 30 in off state. Referring to FIG. 7, of the light from an object on the back side of the display 110, the second polarization component is reflected by the wire grid 70, whereas the first polarization component is transmitted sequentially through the light guide 20, including the wire grid 70, the reflective polarizing plate 40, and the second absorptive polarizing plate 50, and is incident on the off-state pixels $P_{ij}$ of the liquid crystal panel 30. The off state pixels $P_{ij}$ convert the first polarization component incident thereon to the second polarization component, and emit the second polarization component toward the first absorptive polarizing plate 60. Since the first absorptive polarizing plate 60 is designed to transmit the second polarization component therethrough, the second polarization component incident thereon reaches the front side. In this case, since all pixels $P_{ij}$ of the liquid crystal panel 30 are in OFF state, screen portions that correspond to these pixels are displayed in white, and the light incident from the back side is transmitted to the front side. As a result, the back of the display 110 functions in its entirety as a transparent display, with the result that the viewer on the front side can see the object on the back side of the display 11 through the liquid crystal panel 30.

Furthermore, of the light incident from the back side of the display 110, the second polarization component is reflected by the wire grid 70, and therefore, the back of the display 110 becomes a mirror surface to function as a mirror. As a result, the viewer on the back side can see the object reflected by the back of the display 110.

<1.4 Effects>

In the present embodiment, the wire grid 70 is embedded in the light guide 20 in the area close to the back surface. Accordingly, the wire grid 70, which has the function of a conventional component as typified by the reflective polarizing plate 270 as shown in FIG. 15, is integrated with the light guide 220, resulting in a reduced number of components of the display 110 and hence shorter assembly time. Thus, the cost of producing the liquid crystal display device 100 can be reduced.

Furthermore, since the wire grid 70 is embedded in the light guide 20, the wire grid 70 is less likely to be damaged and suffer an impaired polarizer function. On the other hand, the diffusing agent 27 is mixed in the light guide 20 in the area ranging from the front surface to a point slightly short of the wire grid 70. Accordingly, the first or second polarization component incident on the light guide 20 is diffusely reflected by the diffusing agent 27, with the result that light of first and second polarization components is generated. Thus, more light is emitted by the light guide 20, resulting in enhanced image display quality.

Furthermore, the light guide 20 has no diffusing agent 27 added to the area where the wire grid 70 is embedded, and therefore, of the light incident on the light guide 20, only the first polarization component can be transmitted toward the back side of the display 110.

<1.5 Variant>

Figure 8:
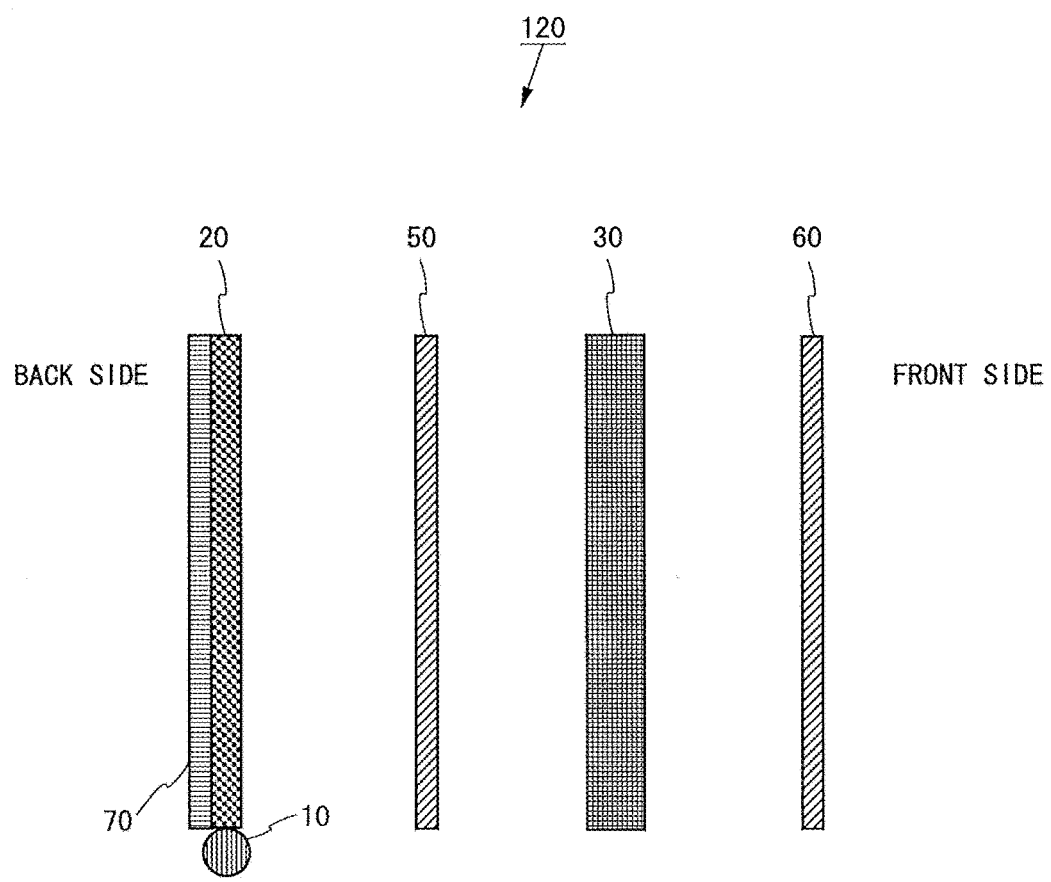
FIG. 8 is a diagram illustrating the configuration of a display included in a liquid crystal display device according to a variant of the embodiment.

FIG. 8 is a diagram illustrating the configuration of a display 120 included in a liquid crystal display device 100 according to a variant of the present embodiment. As shown in FIG. 8, the display 120 in the present variant, unlike the display 110 shown in FIG. 2, does not include the reflective polarizing plate 40 disposed between the light guide 20 and the second absorptive polarizing plate 50. Thus, the display 120 has a reduced number of components, resulting in shorter assembly time.

<2 Variants of the Light Guide>

<2.1 First Variant>

Figure 9:
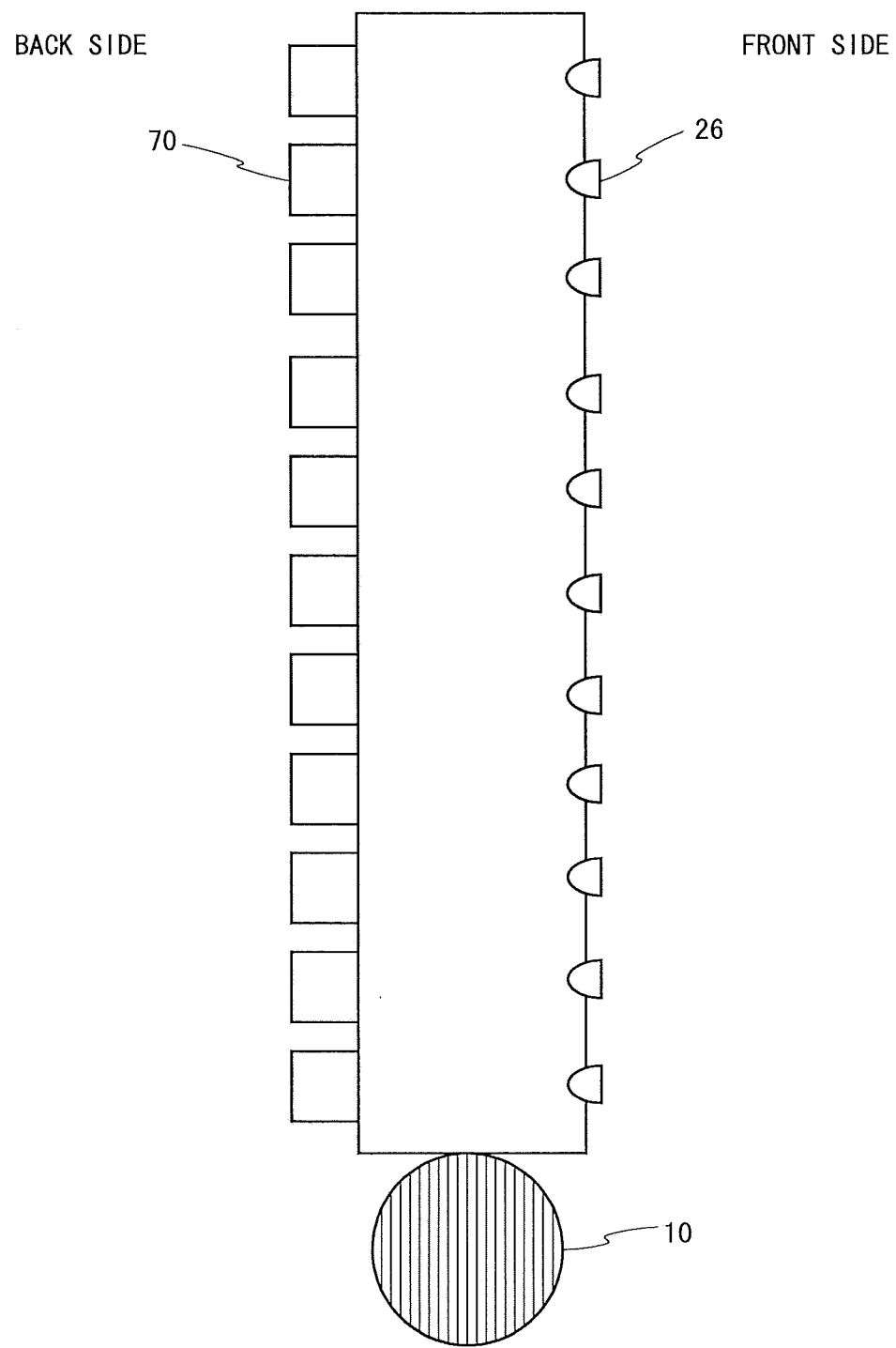
FIG. 9 is a diagram illustrating the configuration of a first variant of the light guide used in the display of the liquid crystal display device shown in FIG. 2.

FIG. 9 is a diagram illustrating the configuration of a first variant of the light guide 20 used in the display 110 of the liquid crystal display device 100 shown in FIG. 2. Unlike the light guide 20 shown in FIG. 3, the light guide 21 has the wire grid 70 formed on the back surface and light extraction geometrical members 26 formed on the front surface. Once light traveling inside the light guide 21, while experiencing total reflections by the surfaces of the light guide 21, is incident on the light extraction geometrical members 26, no total reflection occurs thereafter, which facilitates light extraction from the light guide 21. As a result, the light guide 21 of the present variant achieves effects similar to those achieved by the light guide 20 in the embodiment.

Figure 10:
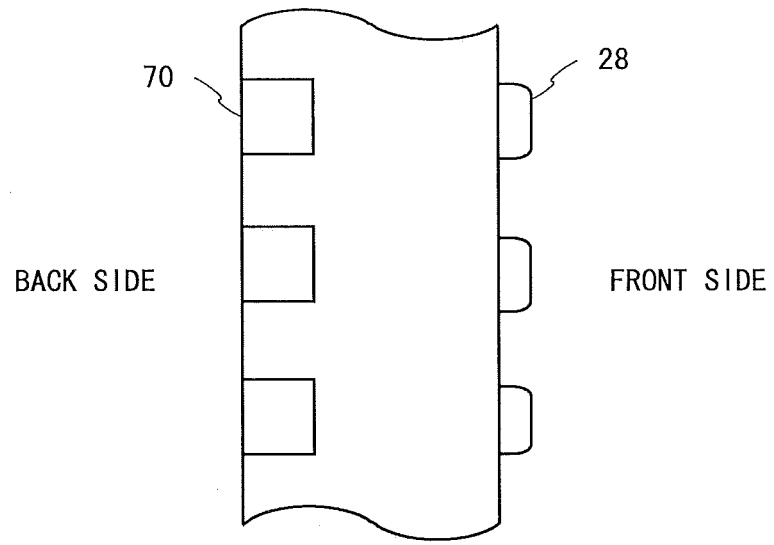
FIG. 10 is a diagram illustrating a light guide on which convex members are formed as light extraction geometrical members as shown in FIG. 9.
Figure 11:
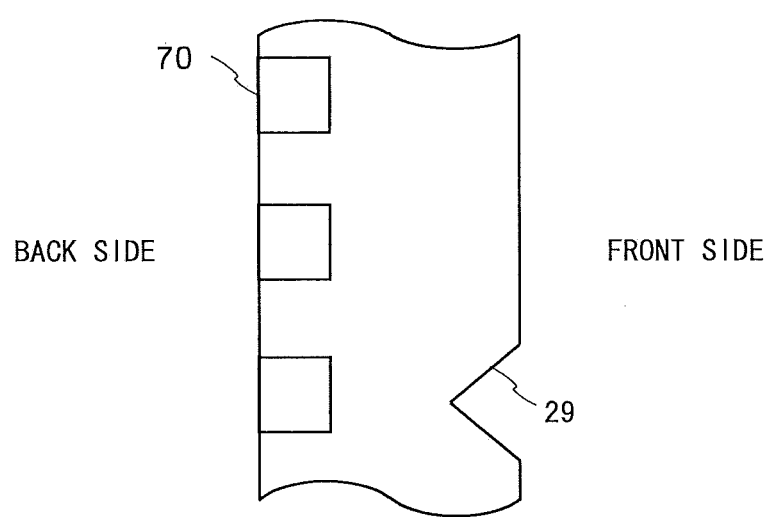
FIG. 11 is a diagram illustrating a light guide on which concave members are formed as light extraction geometrical members as shown in FIG. 9.

Specific examples of the shape of the light extraction geometrical member 26 include convex 28, such as a transparent ink dot the size of about several micrometers, as shown in FIG. 10, and concave 29, such as a pyramid or a cone the size of about several micrometers, as shown in FIG. 11. The dot is formed through printing by an ink-jet printer. Moreover, the concave shape can be formed by processing or cutting the surface of the light guide 20 by means of a laser beam.

<2.2 Second Variant>

Figure 12:
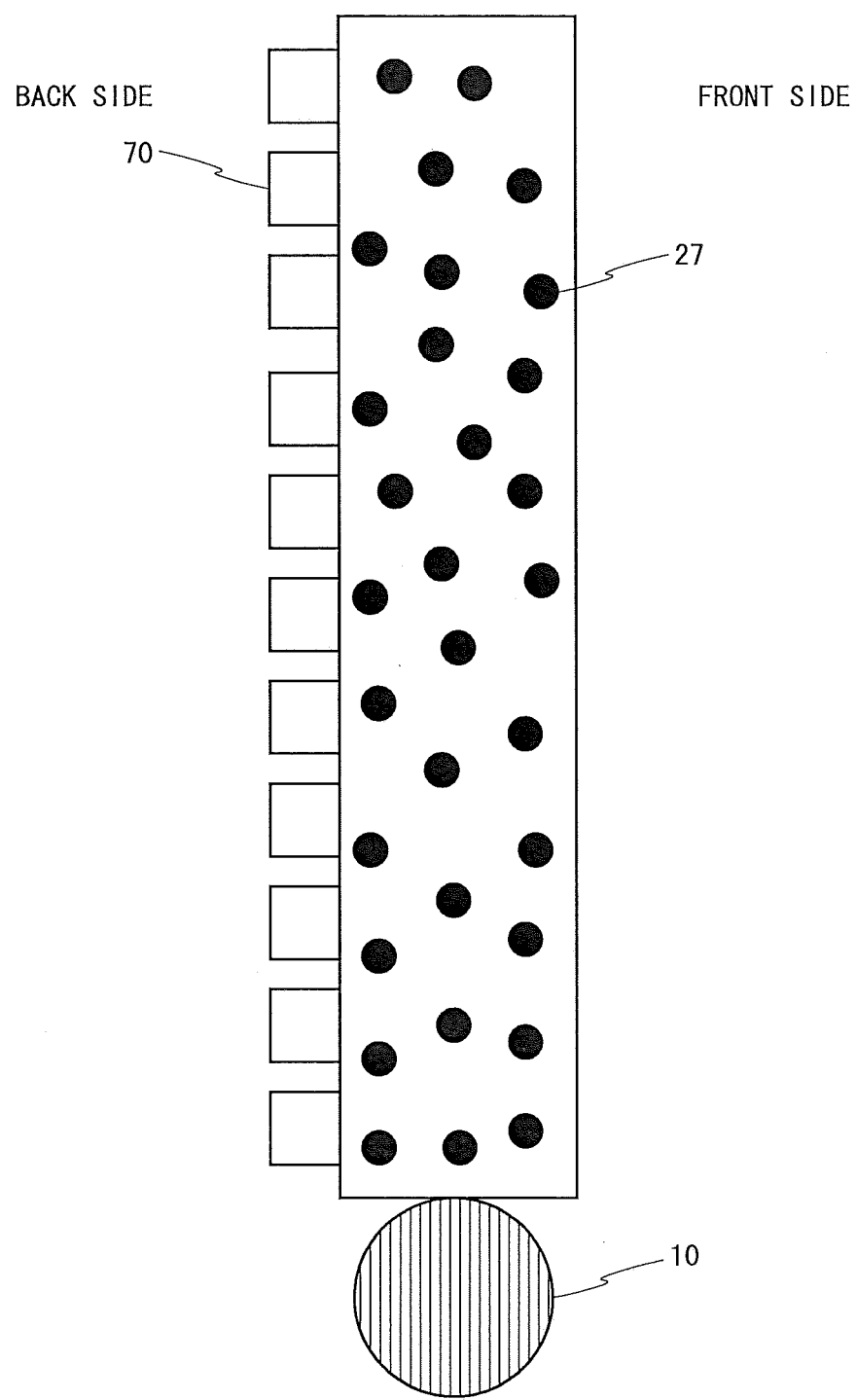
FIG. 12 is a diagram illustrating the configuration of a second variant of the light guide used in the display of the liquid crystal display device shown in FIG. 2.

FIG. 12 is a diagram illustrating the configuration of a second variant of the light guide 20 used in the display 110 of the liquid crystal display device 100 shown in FIG. 2. Unlike the light guide 20 shown in FIG. 3, the light guide 22 of the present variant has the wire grid 70 formed on the back side and the diffusing agent 27, such as particulate silica, added across the entire resin of which the light guide 22 is composed. When light from the light source 10 is incident on the light guide 22, the incident light is diffusely reflected by the diffusing agent 27, with the result that more light is generated and emitted from the light guide 22. Thus, the light guide 22 of the present variant achieves effects similar to those achieved by the light guide 21 of the first variant. Moreover, using the light guide 22 of the present variant eliminates the occurrence of a moiré pattern caused by the light extraction geometrical members 26, as seen when the light guide 21 of the first variant is used, whereby display quality of an image displayed on the display 110 can be enhanced.

<23 Third Variant>

FIG. 13 is a diagram illustrating the configuration of a third variant of the light guide 20 used in the display 110 of the liquid crystal display device 100 shown in FIG. 2. Unlike the light guide 20 shown in FIG. 3, the light guide 23 of the present variant is composed of glass rather than resin and has the wire grid 70 formed on the back surface of the light guide 23. Glass is harder than resin such as PMMA, and therefore, the surface of the light guide 23 is more resistant to damage. Thus, display quality of an image displayed on the display 110 can be enhanced.

<2.4 Fourth Variant>

FIG. 14 is a diagram illustrating the configuration of a fourth variant of the light guide 20 used in the display 110 of the liquid crystal display device 100 shown in FIG. 2. The light guide 24 of the present variant has the light extraction geometrical members 26 formed on the front surface of the light guide 20 in the present embodiment. Thus, the light guide 24 achieves effects similar to those achieved by the light guide 20 in the present embodiment. Moreover, the light extraction geometrical members 26 facilitate light extraction from the light guide 24 toward the front side, resulting in enhanced use efficiency of light in the light guide 24. Forming the light extraction geometrical members 26 on the surface of the light guide 24 in such a manner may be applied to the light guides 22 and 23 of the second and third variants.

This application claims priority to Japanese Patent Application No. 2015 241997, filed Dec. 11, 2015 and titled "Display Device", the content of which is incorporated herein by reference.

INDUSTRIAL APPLICABILITY

The present invention is applied to display devices with see-through displays through which backgrounds are seen.

DESCRIPTION OF THE REFERENCE CHARACTERS 10 light source
20 to 24 light guide
26 light extraction geometrical member
27 diffusing agent
28 convex
29 concave
30 liquid crystal panel (image display portion)
40 reflective polarizing plate
50 second absorptive polarizing plate
60 first absorptive polarizing plate
70 wire grid (reflective polarizer)
100 liquid crystal display device
110, 120 display (see-through display)
111 display control circuit
112 scanning signal line driver circuit
113 data signal line driver circuit
530 organic EL panel

The invention claimed is:

1. A display device with a display capable of display in a transparent display mode whereby a background is seen through the display, the device comprising:
   a light source configured to emit source light;
   a light guide configured to emit the source light derived from the light source and incident thereon toward a front or back side of the display; and
   an image display portion configured to be capable of transmitting the source light emitted by the light guide therethrough, thereby displaying an image based on an image signal externally provided for image display, and also capable of transmitting background light incident from the back side therethrough toward the front side, thereby allowing the background to be seen, wherein
   the light guide has a wire grid integrally provided on a back surface, the wire grid functioning as a reflective polarizer,
   wherein,
   the light guide is formed with a resin and has a first area and a second area provided between a front surface and the first area, the first area having such a depth as to allow the wire grid to be embedded in the back surface of the light guide,
   the wire grid is embedded in the first area, and
   the second area has a diffusing agent added so as to diffusely reflect incident light and thereby generate light of a plurality of different polarizations.

2. The display device according to claim 1, wherein the light guide has a plurality of light extraction geometrical members provided on the front surface.

3. The display device according to claim 1, wherein the wire grid is provided on the back surface of the light guide.

4. The display device according to claim 3, wherein the light guide has a plurality of light extraction geometrical members provided on a front surface.

5. The display device according to claim 4, wherein the light extraction geometrical member is convex or concave.

6. The display device according to claim 3, wherein,
   the light guide is formed with a resin, and
   the light guide has a diffusing agent added across the entirety so as to diffusely reflect incident light and thereby generate light of different polarizations.

7. The display device according to claim 6, wherein the light guide has a plurality of light extraction geometrical members provided on a front surface.

8. The display device according to claim 3, wherein the light guide is formed with glass.

* * * * *